US009727293B1

(12) United States Patent
White et al.

(10) Patent No.: US 9,727,293 B1
(45) Date of Patent: Aug. 8, 2017

(54) METHOD AND APPARATUS FOR PAGINATING ELECTRONIC DOCUMENTS

(75) Inventors: Christopher A. White, Redwood City, CA (US); Fei Wang, Fremont, CA (US); Joseph A. Zuromski, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 1287 days.

(21) Appl. No.: 12/975,282

(22) Filed: Dec. 21, 2010

(51) Int. Cl.
*G06F 3/14* (2006.01)
*G06F 7/10* (2006.01)
*G06F 15/00* (2006.01)
*G06F 17/30* (2006.01)

(52) U.S. Cl.
CPC .................. *G06F 3/14* (2013.01); *G06F 7/10* (2013.01); *G06F 17/30* (2013.01)

(58) Field of Classification Search
CPC ............. G06F 3/14; G06F 17/00; G06F 17/24
USPC ......... 707/704, 234; 709/218, 203; 715/201, 715/251, 247, 256; 719/103; 235/462.1
See application file for complete search history.

(56) References Cited

U.S. PATENT DOCUMENTS

| | | | |
|---|---|---|---|
| 6,556,217 B1 * | 4/2003 | Makipaa et al. ............... | 345/667 |
| 6,986,103 B1 * | 1/2006 | Beezer et al. ................. | 715/234 |
| 7,028,258 B1 * | 4/2006 | Thacker ................ | G06F 17/217 345/660 |
| 7,055,092 B2 * | 5/2006 | Yardumian et al. .......... | 715/234 |
| 7,568,153 B2 * | 7/2009 | Rethore .................... | G06F 8/38 715/202 |
| 8,073,565 B2 * | 12/2011 | Johnson ........................ | 700/245 |
| 8,166,390 B2 * | 4/2012 | Fortes et al. .................. | 715/238 |
| 2004/0199867 A1 * | 10/2004 | Brandenborg ......... | G06Q 10/06 715/201 |
| 2004/0205623 A1 * | 10/2004 | Weil ...................... | G06F 17/217 715/251 |
| 2006/0026512 A1 * | 2/2006 | Hays ..................... | G06F 17/217 715/251 |

(Continued)

OTHER PUBLICATIONS

"Epubjs source code" epub-tools, Apr. 7, 2009, 6 pages.

(Continued)

*Primary Examiner* — Cesar Paula
*Assistant Examiner* — Jian Huang
(74) *Attorney, Agent, or Firm* — Lowenstein Sandler LLP

(57) ABSTRACT

A method and apparatus for paginating documents such as html documents is disclosed. A document viewing engine generates a preliminary layout for the, the preliminary layout having a layout width that is equivalent to a viewport width of a viewport on which the document will be displayed. The document viewing engine computes a final layout for the document based on determining a plurality of horizontal pixel lines where page breaks can be placed without cutting off any element in the document and assigns page breaks to one or more of the plurality of horizontal pixel lines based on a height of the viewport. The document viewing engine identifies, for a current page, one or more visual elements that will not be fully within the viewport if painted. The document viewing engine paints the current page without painting the identified one or more visual elements. After changing from the current page to a new page, the document viewing engine paints the contents of the new page without re-computing the final layout of the document.

22 Claims, 9 Drawing Sheets

(56) References Cited

U.S. PATENT DOCUMENTS

| | | | |
|---|---|---|---|
| 2006/0236264 A1* | 10/2006 | Cain | G06F 3/0481 |
| | | | 715/788 |
| 2009/0150769 A1* | 6/2009 | Konnola et al. | 715/251 |
| 2010/0042916 A1* | 2/2010 | Greenfield et al. | 715/251 |
| 2010/0069035 A1* | 3/2010 | Johnson | 455/404.1 |
| 2012/0270567 A1* | 10/2012 | Johnson | 455/456.3 |

OTHER PUBLICATIONS

Daly, Liz, "Introducing epubjs" Threepress Consulting blog, Feb. 9, 2009, 5 pages.
"CSS Multi-Column Layout Module" W3C, Dec. 17, 2009, 21 pages.
"XML Path Language (XPath) 2.0" W3C, Jan. 23, 2007, 116 pages.

* cited by examiner

METHOD AND APPARATUS FOR PAGINATING ELECTRONIC DOCUMENTS

BACKGROUND OF THE INVENTION

There are two known systems that are capable of paginating html documents. The first system, called "multi-column layout," divides an html document into a sequence of columns. This system is described in "CSS Multi-Column Layout Module," published Dec. 17, 2009. The second system, called "epubjs," generates an overlay that hides visual elements that are not to be displayed in a current page. This system is described in "Threepress Consulting Blog: Introducing epubjs," published on Feb. 9, 2009, and in epubjs source code, published Apr. 7, 2009. Both multi-column layout and epubjs have disadvantages that can make pagination impracticable. Embodiments of the present invention provide a pagination technique that overcomes the disadvantages of multi-column layout and epubjs.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

Methods and systems for paginating electronic documents such as html documents are disclosed. In one embodiment, a document viewing engine generates a preliminary layout for the document, the preliminary layout having a layout width that is equivalent to a viewport width of a viewport on which the document will be displayed. The document viewing engine computes a final layout for the document based on determining a plurality of horizontal pixel lines where page breaks can be placed without cutting off any element in the document. The document viewing engine then assigns page breaks to one or more of the plurality of horizontal pixel lines based on a height of the viewport. The document viewing engine identifies, for a current page, one or more visual elements that will not be fully within the viewport if painted. The document viewing engine paints the current page without painting the identified one or more visual elements. After changing from the current page to a new page, the document viewing engine paints the contents of the new page without re-computing the final layout of the document.

For the purposes of this application, the term element shall be used to describe any component of a document. The term visual element shall be used to describe objects and other contents of a document that will be painted to a display. Visual elements may include, for example, images, tables, text, video, etc. For visual elements that consist of text, each line of text may be a considered a separate visual element.

Figure 1:
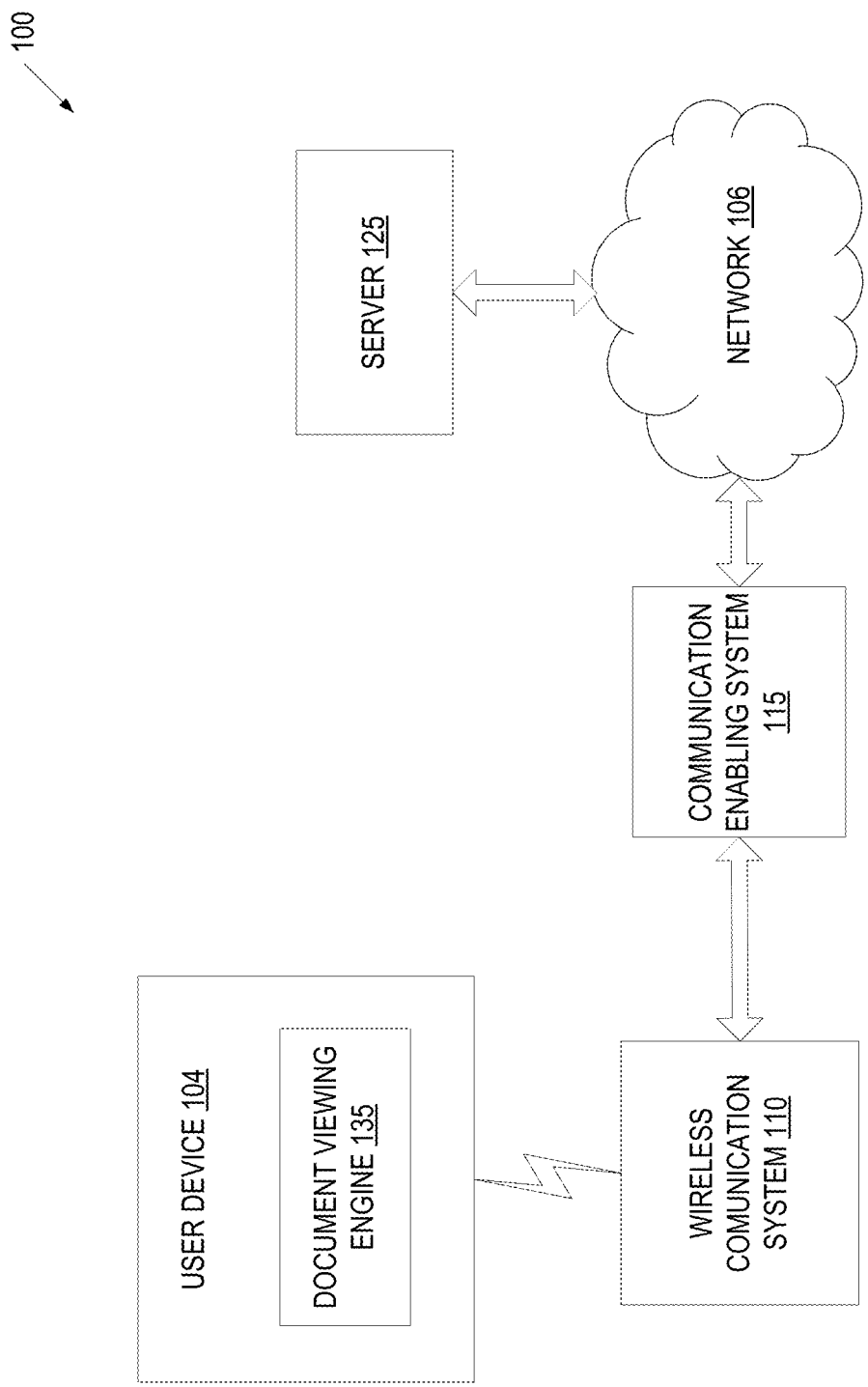
FIG. 1 is a block diagram of an exemplary network architecture, in which embodiments of the present invention may operate.

FIG. 1 is a block diagram of an exemplary network architecture 100, in which embodiments described herein may operate. The network architecture 100 may include a server 125 and one or more user devices 104 capable of communicating with the server 125 via a network 106 (e.g., a public network such as the Internet or a private network such as a local area network (LAN)).

The user device 104 may be a portable computing device such as an electronic book reader, notebook computer, mobile phone, tablet computer, personal digital assistant (PDA), portable media players, netbook, and the like. The user device 104 may also be a non-portable computing device such as a desktop computer, a set-top box associated with a television, a gaming console, and so on. The user device 104 may be configured with functionality to enable the viewing of electronic documents. In one embodiment, the user device includes a document viewing engine 135 for viewing electronic documents. The electronic documents may be extensible markup language (XML) documents, hypertext markup language (HTML) documents (e.g., web pages), extensible hypertext markup language (XHTML) documents, scalable vector graphics (SVG) documents, electronic publications such as electronic books (ebooks), or other types of electronic documents. The electronic documents may include text, tables, digital video (e.g., movies, television, short clips, etc.), images (e.g., art, photographs, etc.), and other multi-media content. In one embodiment, the document viewing engine 135 is a layout engine designed to enable web browsers to render web pages and other electronic documents. In such an embodiment, the document viewing engine 135 may be a component of a web browser (not shown). In one embodiment, the document viewing engine 135 paginates electronic documents such as web pages. The document viewing engine 135 may paginate electronic documents upon receiving a user request to enter a "book mode." Users can then switch between one or more pages of the electronic document as if the user was reading a book.

The server 125 includes a network-accessible server-based functionality, various data stores (not shown), and/or other data processing equipment. The server 125 may be implemented by a single machine or a cluster of machines. The server 125 may include one or more machines (e.g., one or more server computer systems, routers, gateways, etc.) that have processing and storage capabilities to provide the server-based functionality. In one embodiment, the server 125 corresponds to an entity which provides electronic documents (e.g., web pages) to user devices 104 upon the user devices 104 navigating to particular web pages and/or downloading electronic documents. The server 125 delivers, and the user device 104 receives, electronic documents that may include web pages, search results, ebooks, and/or other electronic documents via the network 106.

Communication between the user device 104 and the server 125 may be enabled via any communication infrastructure. One example of such an infrastructure includes a combination of a wide area network (WAN) and wireless infrastructure, which allows a user to use the user device 104 to communicate with server 125 without being tethered to the server 125 via hardwired links. The wireless infrastructure may be provided by one or multiple wireless communications systems, such as wireless communications system 110. Wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user device 104.

The communication infrastructure may also include a communication-enabling system 115 that serves as an intermediary in passing information between the server 125 and the wireless communication system 110. The communication-enabling system 115 may communicate with the wireless communication system 110 (e.g., a wireless carrier) via a dedicated channel, and may communicate with the server 125 via a non-dedicated communication mechanism, e.g., a public Wide Area Network (WAN) such as the Internet.

In addition to wirelessly connecting to wireless communication system 110, user device 104 may also wirelessly connect to the network 106 and/or connect to the network 106 via a wired connection.

Figure 2:
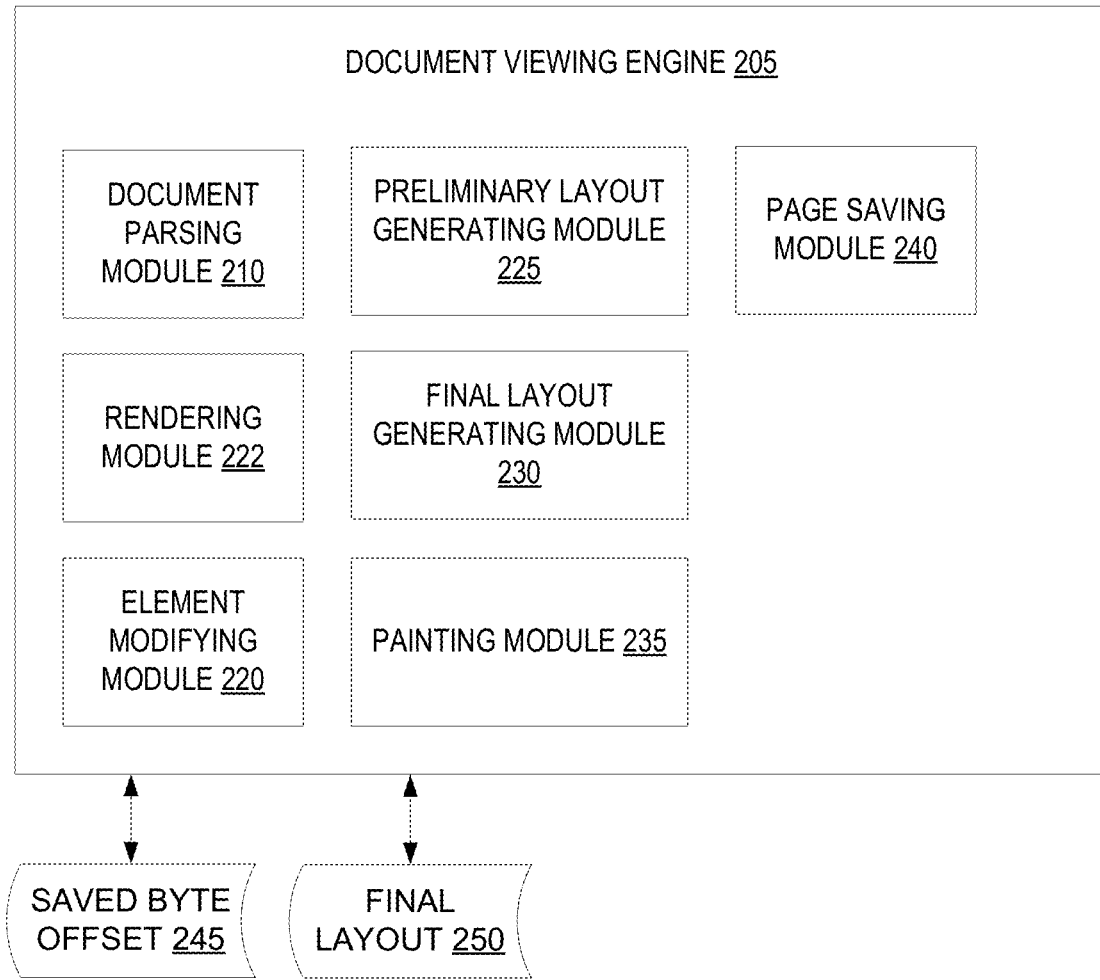
FIG. 2 is a block diagram of one embodiment of a document viewing engine that is included in a user device.

FIG. 2 is a block diagram of one embodiment of a document viewing engine 205 that is included in a user device, which may correspond to document viewing engine 135 of FIG. 1. In one embodiment, document viewing engine 205 includes a document parsing module 210, an element modifying module 220, a rendering module 222, a preliminary layout generating module 225, a final layout generating module 230, a painting module 235 and a page saving module 240. The document viewing engine 205 receives an electronic document. The document viewing engine 205 then generates a layout of the document, then paints the contents of the layout in a viewport of a user device. In one embodiment, document viewing engine 205 is connected to a data store such as a memory, disk drive, or other storage (not shown), on which the document viewing engine 205 stores a final layout 250 and/or a saved byte offset 245 of an element in a current page.

Electronic documents such as html documents and SVG documents are typically not designed to be paginated. Instead, such electronic documents are typically meant to be viewed in a single page whose size often exceeds the size of a viewport. A user is typically expected to scroll vertically and horizontally to view all content of the electronic document.

Figure 3:
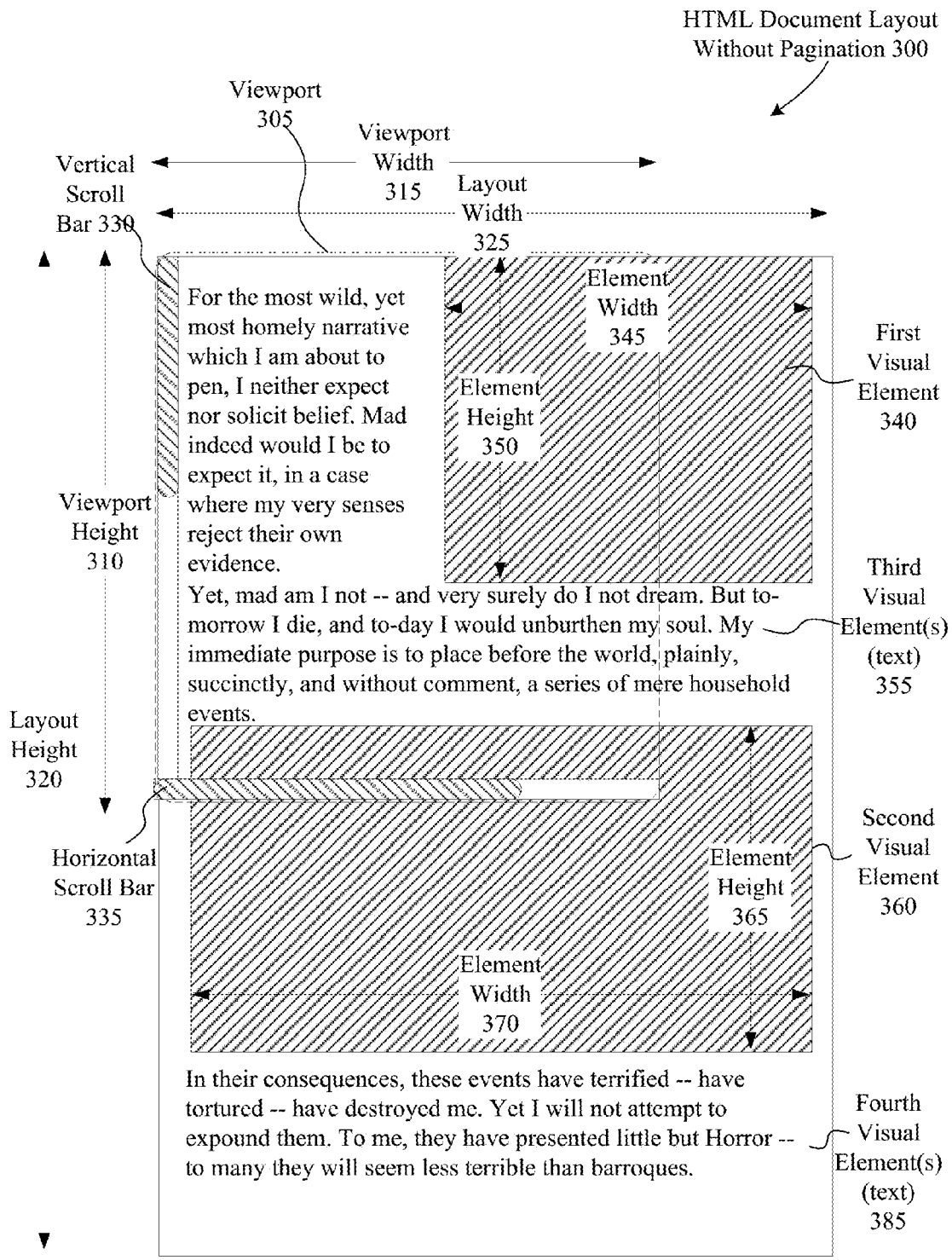
FIG. 3 illustrates an example layout of an html document without implementing pagination.

FIG. 3 illustrates an example layout of an html document 300 without implementing pagination. The html document has a layout width 325 and a layout height 320. However, only data that is inside a viewport 305 is viewable on a user device. As shown, the viewport 305 has a viewport height 310 that is smaller than the document height 320 and a viewport width 315 that is smaller than the document width 325. Accordingly, only a portion of a first visual element 340 and a portion of a second visual element 360 may be inside the viewport 305. Additionally, only portions of some third visual elements 355 (which include multiple lines of text) may be inside of the viewport 305, and none of a fourth visual elements 385 (which include multiple lines of text) may be inside of the viewport 305.

The viewport 305 may include a vertical scrollbar 330 and a horizontal scrollbar 335. To view data that is outside of the viewport 305, a user issues a scroll command using the horizontal scrollbar 335 or the vertical scrollbar 330 to reposition the viewport 305.

In some instances, a user may wish to view an electronic document in a paginated format. Additionally, some display technologies such as electronic ink (e-ink) may perform optimally when viewing paginated electronic documents. Accordingly, referring back to FIG. 2, users may initiate a book mode, in which document viewing engine 205 paginates electronic documents. In one embodiment, document viewing engine 205 paginates electronic documents efficiently with minimal processing. For example, document viewing engine 205 may generate a paginated document layout once, and may not need to perform any additional layout computation as a user switches between pages. Additionally, in one embodiment, the document viewing engine 205 generates a paginated layout of electronic documents that is platform independent. Paginated layouts generated by the document viewing engine 205 can therefore be viewed on Microsoft® Windows® operating systems, Apple® OS X® operating systems, Linux® operating systems, iOS® operating systems, Android® operating systems, Symbian® operating systems, and so on. Additionally, the document viewing engine 205 can generate paginated layouts of electronic documents that can be correctly viewed by web browsers that use the WebKit® Layout Engine (e.g., Safari®, Chrome®, Android's browser, etc.), the Gecko® layout engine (e.g., Mozilla® Firefox®, Netscape®, etc.), the Trident® layout engine (e.g., Microsoft's Internet Explorer®), the Presto® layout engine (e.g., Opera®), and so on.

Each electronic document includes a series of tags. For example, an html document includes a series of html tags. The tags may represent elements of the electronic document, including attribute, formatting and placement information for such elements, such as font information, relative positioning information, and so on. Different electronic document formats, such as the html format and SVG format, provide different standards for the types of tags, contents of tags, tag syntax, and arrangement of tags in the electronic documents.

Document parsing module 210 parses an electronic document that is to be displayed. Parsing an electronic document includes walking through the electronic document and identifying each tag in the electronic document. In one embodiment, parsing the electronic document includes building a Document Object Model (DOM) tree from the identified tags. The parsing module 210 may generate a node in the DOM tree for each tag (or each tag pair) included in the electronic document. A tag pair includes an open tag and a close tag, both associated with a particular node. A DOM tree has at a root node that may represent a first element in the document. The DOM tree has additional nodes that are children of the root node, nodes that are children of those children nodes, and so on down to leaf nodes, which have no children. Nodes generated from tags that occur after a previous open tag and before the previous open tag's corresponding close tag are children of the node representing the previous open tag.

In one embodiment, the document parsing module 210 uses a counter to count the number of bytes that have been parsed. Each time a tag is encountered in the document, the document parsing module 210 records the byte count at the location in the document for that tag. The document parsing module 210 therefore identifies a byte offset within the electronic document for each tag. The document parsing module 210 adds the byte offset information for a tag to an appropriate node of the DOM tree. Each node may be assigned a start byte offset and an end byte offset.

Figure 4:
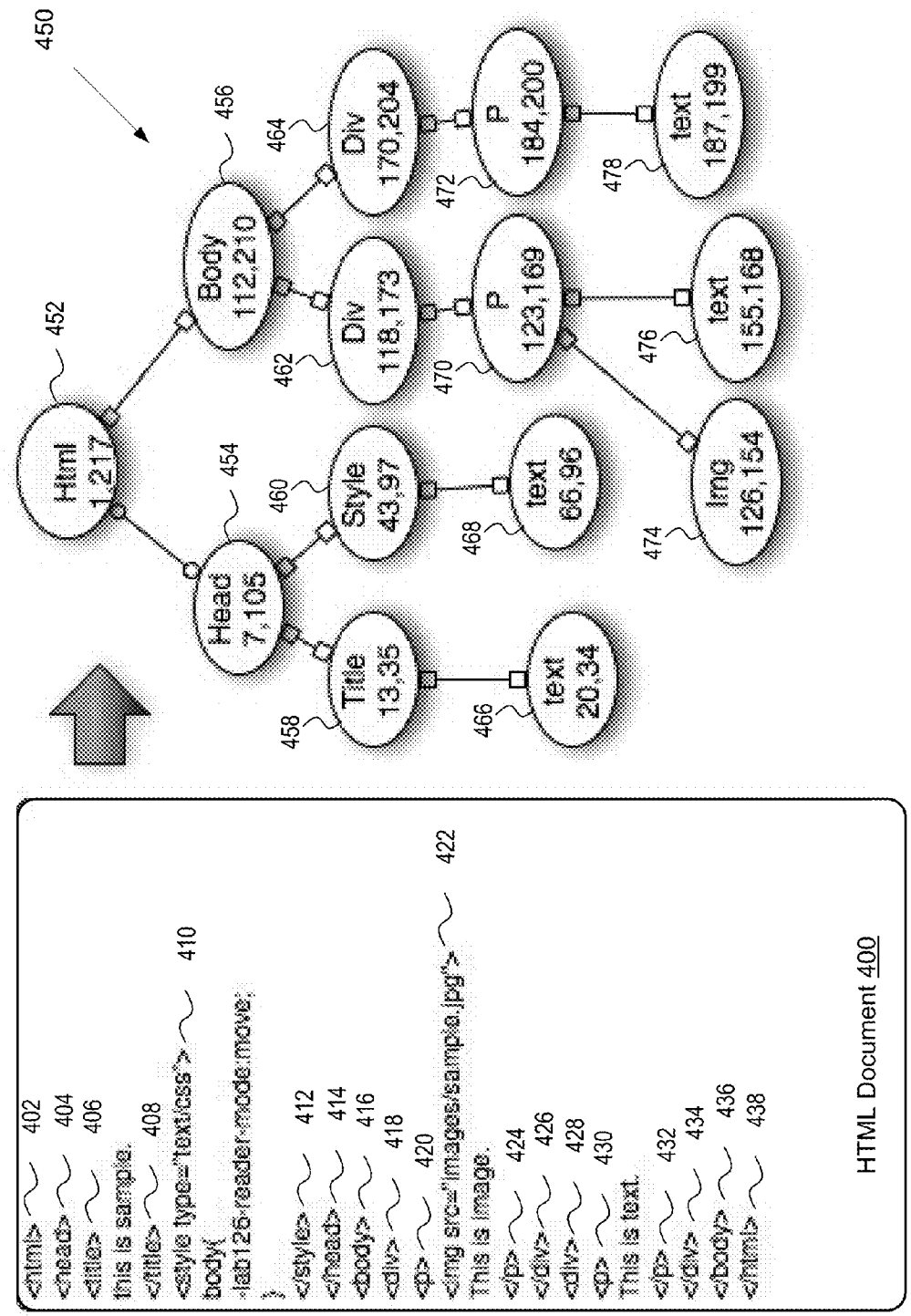
FIG. 4 illustrates a simple example html document and a corresponding DOM tree.

FIG. 4 illustrates a simple example html document 400 and an example DOM tree 450 generated from the html document 400, in accordance with one embodiment of the present invention. The html document 400 includes a collection of html tags 402-438, each of which is located at a particular byte offset within the html document. Tags without a "/" symbol are open tags and tags with a "/" symbol are close tags.

The DOM tree 450 has a node for each self closing tag in the document 400, as well as a node for each tag pair (which includes an open tag and a close tag). The DOM tree 450 has an html root node 452 with byte offsets 1 (the byte offset for tag 402, which is an open html tag) and 217 (the byte offset for tag 438, which is a close html tag). The DOM tree 450 includes a head node 454 and a body node 456, each of which are child nodes of the html node 452. As shown, the head node 454 includes byte offsets 7 (corresponding to the open head tag 404) and 105 (corresponding to the close head tag) and the body node 456 includes byte offsets 112 (corresponding to the open body tag 112) and 210 (corresponding to the close body tag). Each of these nodes includes children nodes, which in turn include additional children nodes, and so on. At the bottom of the DOM tree 450 are leaf nodes 466, 474, 476 and 478. Each leaf node may include, for example, text or multimedia content. The multimedia content may be embedded objects such as images, tables, audio clips, video, Java Applets, flash components, active X components, etc.

Again referring to FIG. 2, once the document is parsed and the DOM tree has been generated, rendering module 222 generates a render tree for the document. The render tree is a counterpart to the DOM tree, and may be generated based on the DOM tree and/or a cascading style sheet (CSS). The render tree is a tree of render objects. Each render object contains render information such as contents (e.g., text, image, video, etc.) and render logic. Each render object may include information from multiple nodes in the DOM tree. In one embodiment, a render object is a visual element of the document.

Once the render tree is generated, element modifying module 220 scans the electronic document to identify any visual elements that have a width that is greater than a threshold width. In one embodiment, the threshold width is equal to a width of a viewport in which the html document will be displayed. In another embodiment, the threshold width is smaller than the viewport width. In one embodiment, the threshold width is set by a publisher of the electronic document. Alternatively, the threshold width may be controlled by a user, or may be based on a default setting. For example, the threshold width may be a percentage of the viewport width (e.g., 95% of the viewport width). If the document will be shown in a full screen mode, then the viewport may be the size of a display (e.g., the size of a user device's screen). Alternatively, the viewport may be smaller than the size of the display. For example, the viewport may be the size of an open web browser window. In one embodiment, element modifying module 220 walks through the DOM tree and/or render tree generated from the electronic document to search for visual elements that have widths greater than the width threshold.

When a visual element with a width that is larger than the threshold width is identified, element modifying module 220 resizes the visual element so that the element will no longer have a width that is larger than the width threshold. The visual element may be resized so that it has a width that is approximately equal to a second width threshold. The second width threshold may be smaller than the first width threshold. For example, the first width threshold may be 95% of the viewport width, and the second width threshold may be 75% of the viewport width. Alternatively, the visual element may be rescaled so that it has a width that is less than or equal to the width of the viewport. In one embodiment, the width is adjusted from an absolute value (e.g., 700 pixels) to a relative value (e.g., 85% of the viewport width).

If the element is, for example, an image or video, then the element modifying module 220 may rescale the element. The vertical and horizontal dimensions of the element may be rescaled an equal amount to maintain an aspect ratio of the element. Alternatively, the horizontal and vertical dimension of the element may be rescaled by different amounts (e.g., the horizontal dimension may be rescaled without adjusting the vertical dimension). If the visual element is a table, then the visual element may contain additional visual elements such as images and text. In one embodiment, tables are resized by performing a zoom out function. The zoom out function adjusts the sizing of the visual element and all sub-elements contained in the element the same. Therefore, size ratios between the table and the contents of the table may be maintained.

In one embodiment, the electronic document and/or document viewing engine include resizing settings. One of the resizing settings may be the aforementioned threshold width. Other resizing settings include a minimum visual element size and a maximum resizing threshold. The minimum visual element size may specify that a visual element should not have a width less than a specified value (e.g., less than 300 pixels). Similarly, the maximum resizing threshold may specify that a visual element may not be reduced below a particular percentage (e.g., 50%) of the visual element's original size. The resizing settings may also control other resizing behavior, such as controlling the aspect ratio for resized elements, and so forth. Each visual element in the electronic document may have separate resizing settings. Additionally, the electronic document and/or document viewing engine may have resizing settings that apply to multiple (e.g., all) visual elements. If a visual element cannot satisfy one or more resizing settings (e.g., if it must be resized to below the minimum visual element size to fit into the viewport), then that visual element may not be displayed.

Once the element modifying module 220 has adjusted any elements that exceeded the width threshold, the element modifying module 220 updates information for those adjusted elements in the DOM tree and/or render tree. In one embodiment, the element modifying module 220 is a javascript.

Preliminary layout generating module 225 generates a preliminary layout using the generated DOM tree and/or render tree. Preliminary layout generating module 225 generates the preliminary layout by fixing a layout width that may be equal to or smaller than the viewport width. Generating the preliminary layout may include determining positions (e.g., x and y coordinates) and sizes (e.g., height and width) for each viewable element in the electronic document. The location and size information may be relative location and size information, or may be absolute position and size information. The preliminary layout may include position and size information for floating elements as well as standard elements having fixed positions. Accordingly, the preliminary layout includes position information and size information for each render object in the render tree. Since the preliminary layout has a layout width that is equal to or less than the width of the viewport, a user will not need to scroll horizontally to view all of the contents of the electronic document.

Once the preliminary layout is generated, final layout generating module 230 uses the preliminary layout to generate a final layout. Generating the final layout includes walking through the preliminary layout and identifying each horizontal pixel line (vertical offset) in the preliminary layout where a page break could be placed without cutting off a visual element (e.g., a line of text, an image, a table, etc.). For example, one visual element might span vertical offsets 1-10, and another visual element might span vertical offsets 9-20. Therefore, no page breaks may be placed in this example between vertical offsets 1 and 20. Once all of the horizontal pixel lines at which page breaks could potentially be placed are identified, the final layout generating module 230 assigns page breaks to one or more of the identified horizontal pixel lines. The page breaks are placed based on the height of the viewport. Each page break is the closest allowed break point to the viewport height. The page breaks may be placed such that, for each page, the viewport displays a maximum amount of content (e.g., text, images, tables, or other elements) without cutting off any visual element (e.g., any line of text, picture, table, etc.). In one embodiment, a vertical start offset and a vertical end offset for each page is recorded. This information may be recorded in a vector format and associated with or attached to the final layout.

The final layout 250 may be saved. In one embodiment, the final layout is cached in a volatile memory for use during a current user session. The final layout may also be saved in a non-volatile storage so that the final layout does not need to be re-computed in future sessions.

Painting module 235 paints the layout for a current page. Painting the layout for a current page includes drawing the viewable elements in the viewport to a display. Unlike conventional layout engines, which paint all content that fits into a current viewport, painting module 235 determines which elements that fit into a current viewport to paint and which elements that fit into the current viewport not to paint. The viewport for a current page may include pixel lines that would ordinarily display contents of part of an element (e.g., text, image, border of a box, etc.). However, such a cut-off element may be confusing or undesirable for users. Additionally, this element will be fully shown in a subsequent page. Accordingly, those horizontal pixel lines that appear after a page break, but that are within the viewport of the current page are not painted in the viewport. In other words, if an element will not be fully shown in the current viewport, that element will not be painted to the display. For example, consider a viewport that is 600 pixels high, but with a page break that occurs at the vertical offset of pixel 580. In this case, any element that is located in the last 20 pixels (between pixels 580 and 600) will not be painted. Notably, the visual elements that would be cut-off are not painted and then covered up with an additional element that looks the same as a background. Rather, these elements are not painted at all.

When a change page command is received, the painting module 235 paints the new page. No re-computation of any of the preliminary layout, final layout, DOM tree or render tree are performed when a page is changed.

Figure 5:
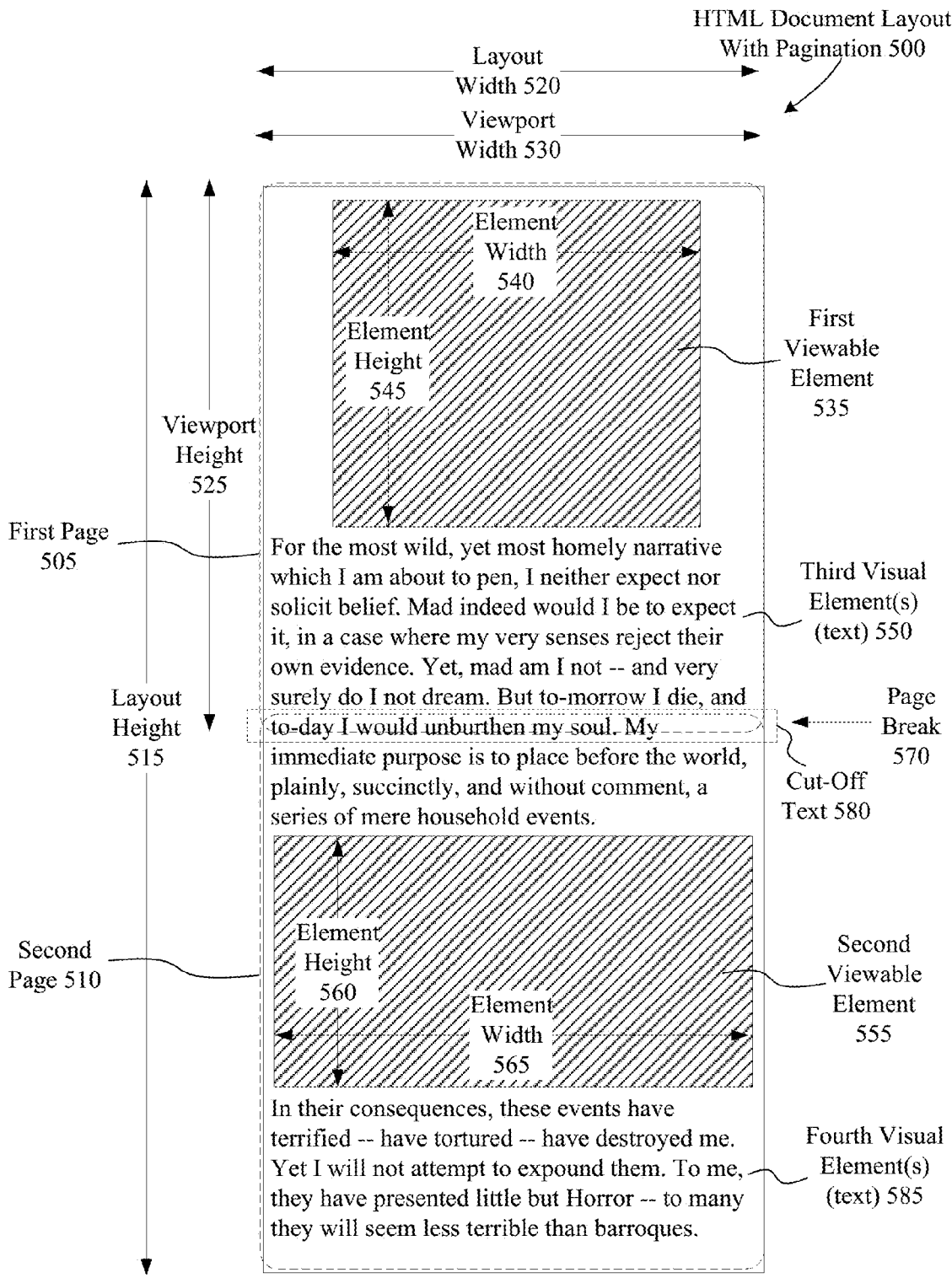
FIG. 5 illustrates an example layout of the html document shown in FIG. 4, but with pagination enabled, in accordance with one embodiment of the present invention.

FIG. 5 illustrates an example layout 500 of the html document shown in FIG. 4, but with pagination enabled, in accordance with one embodiment of the present invention. The layout 500 is divided into a first page 505 and a second page 510, the first page 505 and second page 510 being separated by a page break 570. A viewport defines a vertical paint range for a current page, and displays the contents of a currently selected page. Only data that is inside the viewport (in the vertical paint range for the current page) is visual on a user device. As shown, the viewport has a viewport height 525 that is smaller than the layout height 515 and a viewport width 315 that is the same size as a viewport width 530. Notably, there are no scroll bars within the viewport. Rather than scrolling vertically and/or horizontally to view all content of the html document, a user merely needs to flip pages using, for example, a next page or previous page command.

Both html document layout 400 and html document layout 500 include a first visual element 340 and 535, respectively, and a second visual element 360 and 555, respectively. However, as can be seen in FIG. 4, second visual element 360 has an element width 370 that is greater than the viewport width 315. Accordingly, in html document layout 500 the second visual element 555 has been resized such that second visual element 555 has an element width that is smaller than the viewport width 530. Additionally, both html document layout 400 and html document layout 500 include third visual elements 355 and 550, respectively, and fourth visual elements 385 and 585, respectively.

As shown in layout 500, the viewport for the first page 505 includes pixel lines that would ordinarily display contents of part of an element (cut-off text 580). However, in one embodiment of the present invention, those horizontal pixel lines that appear after page break 570, but that are within the viewport of the first page 505 are not painted in the viewport. Therefore, cut-off text 580 would not be painted in the viewport when first page 505 is the current page.

Returning to FIG. 2, page saving module 240 may save the byte offset of the tag or node associated with an upper left most element included in a current page. Therefore, when a user ends a current session and then later starts a new session, the document viewing engine 205 may automatically present the last viewed page by displaying a page that has at its upper left the element having the saved byte offset.

Additionally, a user may issue a command to resize the text displayed in the layout of the html document. A resizing of the text may require that the preliminary layout be recomputed, and that the final layout then be recomputed from the preliminary layout. A resizing of the text may also cause the DOM tree and/or render tree to be re-computed. After the final layout is recomputed, the pages will likely have changed. However, a current reading location of a user can still be maintained based on the saved byte offset. The element associated with the saved byte offset may be placed in the upper left corner of the current viewport, and pagination may proceed from the current page. Pagination may proceed backwards and forwards from the current page. This may result in the first page having less than an entire page's worth of content. If this occurs, once the user shifts back to the first page, the document may be repaginated starting from the beginning of the document. Alternatively, the first page may be shown with some contents that are also in the second page. Therefore, a user's reading location may be maintained regardless of changes to the text size.

If a document includes externally added content (e.g., content that is dynamically added using AJAX or javascript), a current layout may become incorrect. Accordingly, the DOM tree, render tree, preliminary layout and/or final layout may be recomputed if dynamic content is added to the document. Alternatively, the document viewing engine 205 may prevent such additional content from being added to the document.

Figure 6:
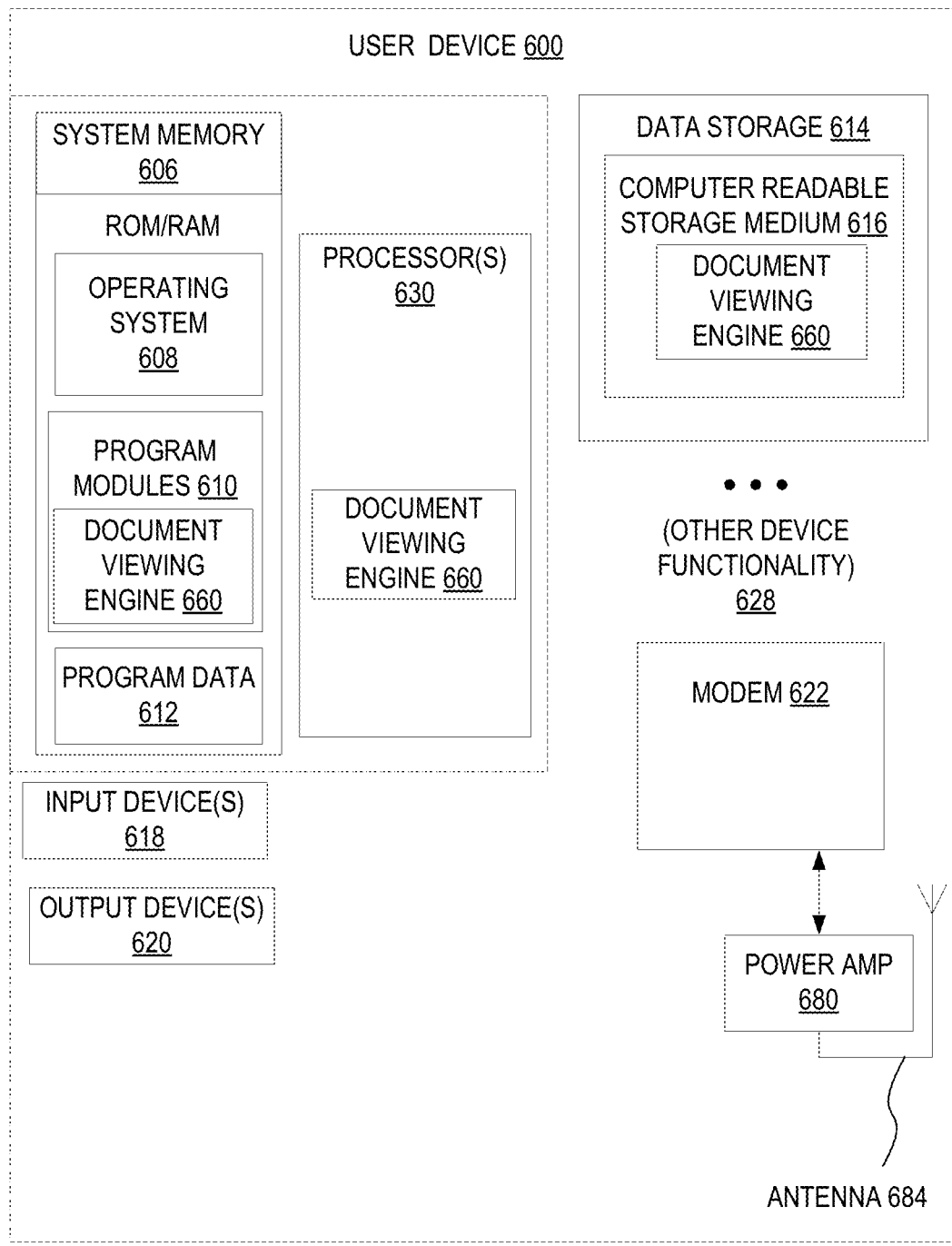
FIG. 6 is a block diagram illustrating an exemplary user device, in accordance with one embodiment of the present invention.

FIG. 6 is a block diagram illustrating an exemplary user device 600, in accordance with one embodiment of the present invention. The user device 600 may correspond to the user device 104 of FIG. 1 and may be any type of user device such as an electronic book reader, a PDA, a mobile phone, a laptop computer, a portable media player, a tablet computer, an electronic pad, a desktop computer, a camera, a video camera, a netbook, and the like.

The user device 600 includes one or more processors 630, such as one or more CPUs, microcontrollers, field programmable gate arrays, or other types of processors. The user device 600 also includes system memory 606, which may correspond to any combination of volatile and/or non-volatile storage mechanisms. The system memory 606 stores information which provides an operating system component 608, various program modules 610 such as document viewing engine 660, and/or other components (e.g., a web browser). The user device 600 performs functions by using the processor(s) 630 to execute instructions provided by the system memory 606.

The user device 600 also includes a data storage device 614 that may be composed of one or more types of removable storage and/or one or more types of non-removable storage. The data storage device 614 includes a computer-readable storage medium 616 on which is stored one or more sets of instructions embodying any one or more of the methodologies or functions described herein. As shown, instructions for the document viewing engine 660 may reside, completely or at least partially, within the computer readable storage medium 616, system memory 606 and/or within the processor(s) 630 during execution thereof by the user device 600, the system memory 606 and the processor(s) 630 also constituting computer-readable media. The user device 600 may also include one or more input devices 618 (keyboard, mouse device, specialized selection keys, etc.) and one or more output devices 620 (displays, printers, audio output mechanisms, etc.).

The user device 600 may also include a wireless modem 622 to allow the user device 600 to communicate via a wireless network (e.g., such as provided by the wireless communication system) with other computing devices, such as remote computers, the item providing system, online book stores, electronic catalogs for libraries, and so forth. The wireless modem 622 may allow the user device 600 to handle both voice and non-voice communications (such as communications for text messages, multimedia messages, media downloads, web browsing, etc.) with the wireless communication system 110. The wireless modem 622 may provide network connectivity using any type of mobile network technology. The wireless modem 622 may generate signals and send these signals to power amplifier (amp) 680 for amplification, after which they are wirelessly transmitted via antenna 684. In addition to sending data, antenna 684 also receives data (e.g., electronic documents), which is sent to wireless modem 622 and transferred to processor(s) 630.

Figure 7:
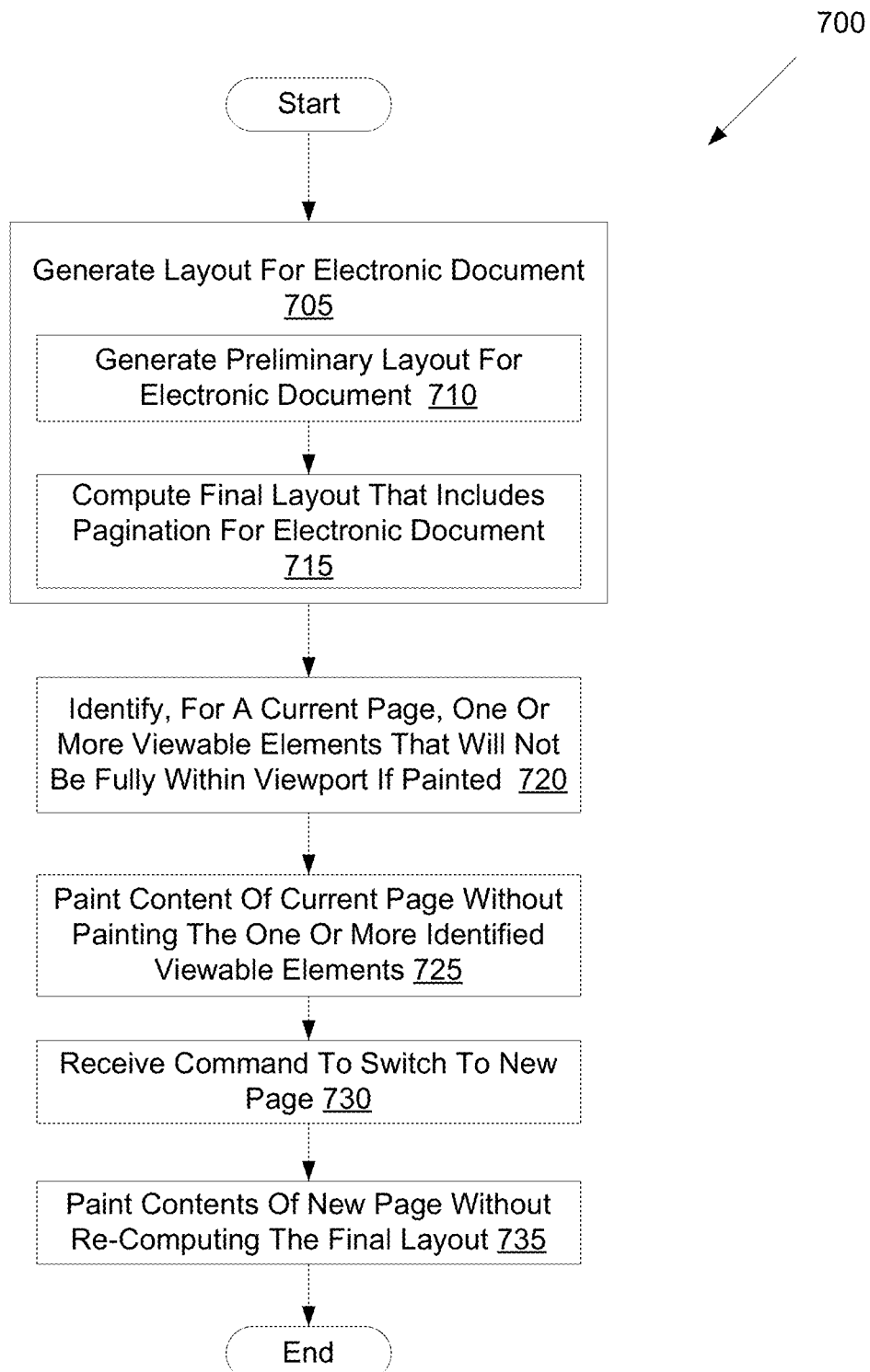
FIG. 7 is a flow diagram of one embodiment for a method of paginating an electronic document.

FIG. 7 is a flow diagram of one embodiment for a method 700 of paginating an electronic document. The method is performed by processing logic that may comprise hardware (circuitry, dedicated logic, etc.), software (such as is run on a general purpose computer system or a dedicated machine), or a combination of both. In one embodiment, method 700 is performed by a user device or by a component of a user device. For example, method 700 may be performed by a user device 104 of FIG. 1. In one embodiment, processing logic includes one or more hardware or software modules, such as the modules of document viewing engine 135.

Referring to FIG. 7, at block 705 of method 700 processing logic generates a layout for the electronic document. Generating the layout may include assigning a layout width and computing relative and/or absolute positions and sizes of visual elements of the electronic document and arranging those visual elements within the boundaries of the assigned layout width. The layout may have a fixed layout width that is the same size as, or smaller than, a viewport width. In one embodiment, generating the layout includes generating a preliminary layout that does not include any pagination information (block 710). Then at block 715, processing logic may compute a final layout that includes pagination for the electronic document. Generating the final layout may include determining absolute positioning of visual elements. Additionally, generating the final layout may include determining where page breaks can be assigned without cutting off any visual elements of the document, and assigning page breaks to one or more of the locations where page breaks can occur based on a viewport height. In an alternative embodiment, a single layout is generated without first computing a preliminary layout. The single layout may include the contents of the preliminary layout and the contents of the final layout.

At block 720, processing logic identifies any visual elements in the current page that are not fully within the current page (e.g., that have a portion in a subsequent page). These elements are located at one or more pixel lines from the final layout that are after a page break for a subsequent page, but that are within the viewport height for the current page. The content of the current page is painted without painting the visual elements at the one or more identified horizontal pixel lines. Therefore, in one embodiment, no visual elements will span (be shown in) two pages.

At block 730, processing logic receives a command to switch to a new page. At block 735, processing logic paints the contents of the new page without re-computing the final layout. Since the final layout only needs to be computed once, there is minimal overhead introduced by changing pages. Thus, the time used to display a new page is minimal.

Figure 8:
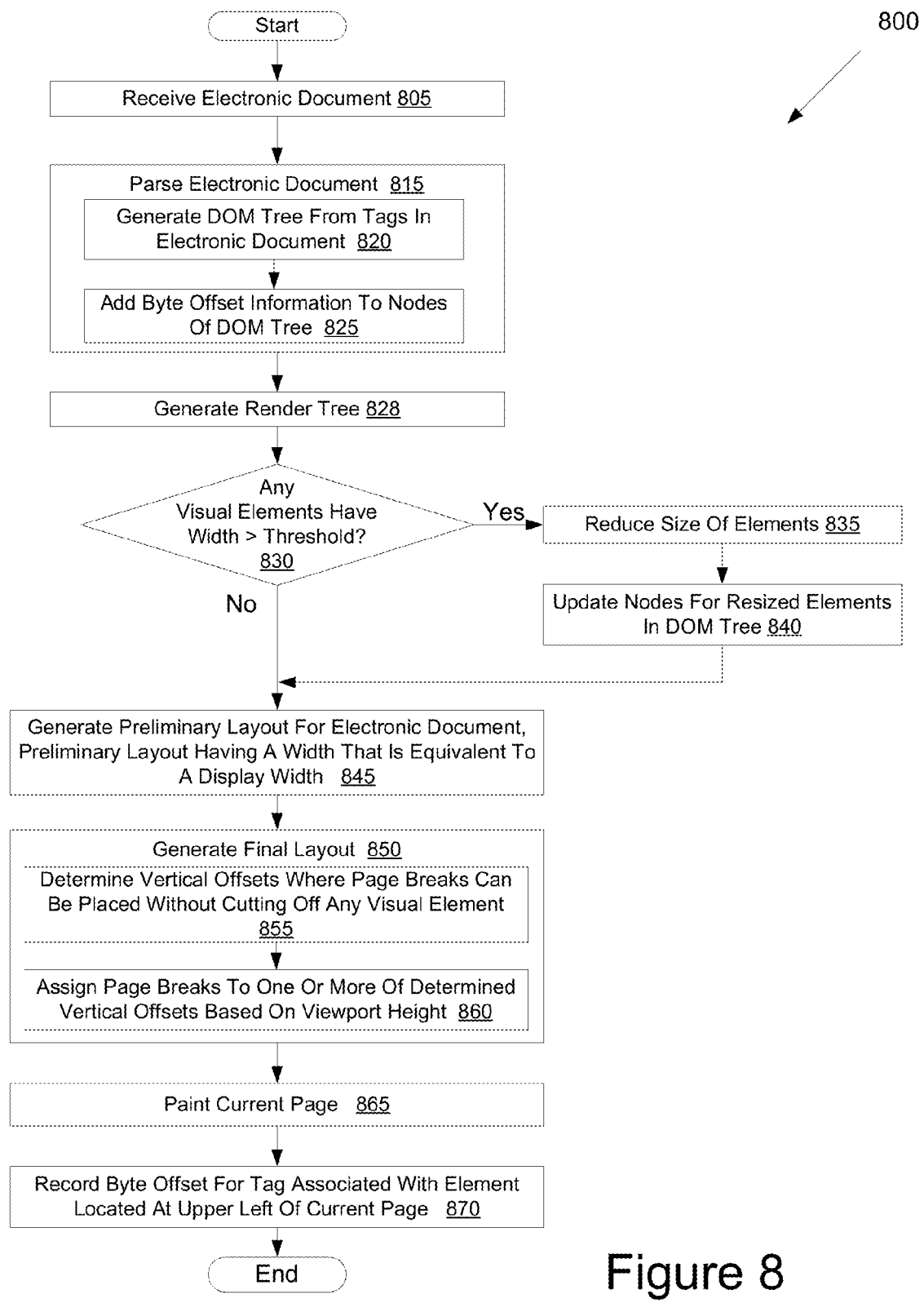
FIG. 8 is a flow diagram of another embodiment for a method of paginating an electronic document.

FIG. 8 is a flow diagram of another embodiment for a method 800 of paginating an electronic document. The method is performed by processing logic that may comprise hardware (circuitry, dedicated logic, etc.), software (such as is run on a general purpose computer system or a dedicated machine), or a combination of both. In one embodiment, method 800 is performed by a user device or by a component of a user device. For example, method 800 may be performed by a user device 104 of FIG. 1. In one embodiment, processing logic includes one or more hardware or software modules, such as the modules of document viewing engine 135.

Referring to FIG. 8, at block 805 of method 800 processing logic receives an electronic document. At block 815, processing logic parses the electronic document. In one embodiment, parsing the electronic document includes generating a DOM tree from tags in the electronic document (block 820) and adding byte offset information to nodes of the DOM tree (block 825). Nodes in the DOM tree may be associated with a tag or a tag pair (having an open tag and a close tag). For example, a self closing tag may be associated with a node of the DOM tree, and a beginning byte offset for the self closing tag and an ending byte offset for the self closing tag may be added to the node in the DOM tree associated with the self closing tag. For a node associated with a tag pair, a byte offset of the open tag and a byte offset of the close tag may be added to the node.

At block 828, processing logic generates a render tree for the electronic document. The render tree may be generated from the DOM tree and/or a CSS sheet. Each node in the render tree may be a render object, which may be for a visual element or a non-visual element. Each node in the render tree may include a location and size of the render object.

At block 830, processing logic determines whether any visual elements in the electronic document have an element width that is greater than a width threshold. The width threshold may be the size of a viewport width or may be smaller than the viewport width. Processing logic may make this determination by walking through the tags of the electronic document and/or walking through the DOM tree and/or render tree. If any visual elements have a width that is greater than the width threshold, the method proceeds to block 835. Otherwise, the method continues to block 845.

At block 835, processing logic reduces a size of those visual elements that had an element width that exceeded the width threshold. Reducing the element's size may include rescaling the element and/or performing a zoom out operation on the element. At block 840, processing logic then updates the nodes in the DOM tree and render tree associated with the resized elements. The method then continues to block 845.

At block 845, processing logic generates a preliminary layout for the electronic document. The preliminary layout has a layout width that is equivalent to or smaller than a viewport width. Generating the preliminary layout may include determining a relative and/or absolute position and size for each of the visual elements (e.g., for each render object in the render tree).

At block 850, processing logic generates a final layout for the electronic document. In one embodiment, at block 855, processing logic determines vertical offsets (e.g., for horizontal pixel lines) where page breaks can be placed without cutting off any visual element. At block 860, processing logic assigns page breaks to one or more of the vertical offsets based on a viewport height. Note that the final layout includes proper placement of floating visual elements as well as fixed visual elements.

At block 865, processing logic paints the visual elements of the current page in a viewport on a display. At block 870, processing logic records a byte offset for a tag associated with an element located at the upper left of the current page.

Figure 9:
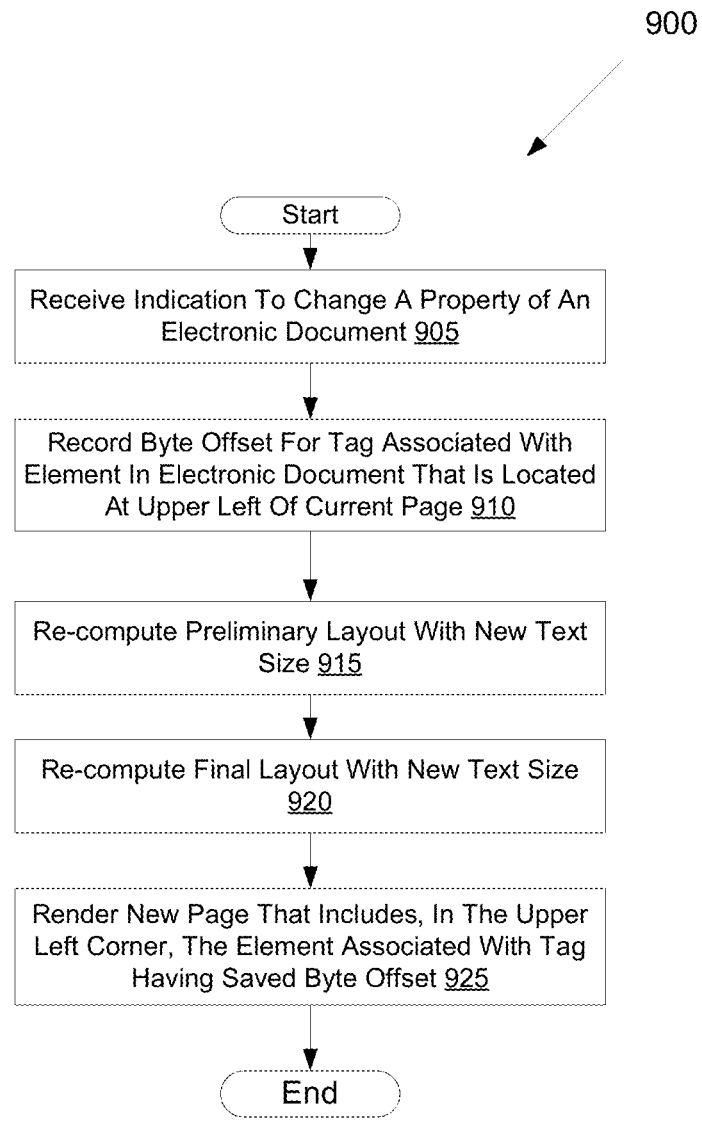
FIG. 9 is a flow diagram of one embodiment for a method of re-paginating an electronic document after a text size is changed.

FIG. 9 is a flow diagram of one embodiment for a method 900 of re-paginating an electronic document after a text size is changed. The method is performed by processing logic that may comprise hardware (circuitry, dedicated logic, etc.), software (such as is run on a general purpose computer system or a dedicated machine), or a combination of both. In one embodiment, method 900 is performed by a user device or by a component of a user device. For example, method 900 may be performed by a user device 104 of FIG. 1. In one embodiment, processing logic includes one or more hardware or software modules, such as the modules of document viewing engine 135.

Referring to FIG. 9, at block 905 of method 900 processing logic receives an indication to change a property in an electronic document. The changed property may be a changed text size, a changed line spacing, a changed character spacing, a changed font, an addition of a new visual element or other contents, a removal of a visual element, or any other property whose change will affect how visual elements are displayed. In one embodiment, the indication to change the property is a user command to change the property. The indication to change the property may also be receipt of additional content to display in the electronic document. For example, if the electronic document is large, processing logic may only paginate a portion of the electronic document at a time. When a user is nearing an end of a currently paginated portion of the electronic document, a next portion of the electronic document may be paginated. For method 900, a preliminary layout and final layout that includes pagination have already been computed for the electronic document, and one or more pages have been viewed by a user. Additionally, at the time that the command to change the property is received, a current page of the final layout may be open.

At block 910, processing logic records a byte offset for a tag associated with an element in the electronic document that is located at the upper left of the current page. This is assuming that text is read from left to write, and top to bottom. If text were read, for example, from right to left (e.g., as with some Japanese text), then the byte offset of the tag associated with the upper right of the current page may be saved.

At block 915, processing logic re-computes the preliminary layout with the new text size. Processing logic may also re-compute the DOM tree and/or render tree prior to re-computing the preliminary layout. At block 920, processing logic then re-computes the final layout with the new text size. In one embodiment, at blocks 915 and 920 processing logic performs the operations of method 800.

At block 925, processing logic paints a new page that includes, at the upper left corner, the element associated with the tag having the saved byte offset. Therefore, a user may continue reading where the user left off.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "computing", "painting", "scanning", "identifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of paginating an electronic document comprising:
    receiving, by a processor of a user electronic device comprising a viewport for viewing the electronic document, the electronic document in an unpaginated format;
    generating, by the processor, a preliminary layout for the electronic document in the unpaginated format, the preliminary layout having a layout width that is equivalent to a viewport width of the viewport of the user electronic device, the viewport configured to display the electronic document, wherein generating the preliminary layout comprises:
        generating a Document Object Model (DOM) tree comprising first byte offset information for a first visual element of the electronic document in the unpaginated format and second byte offset information for a second visual element of the electronic document in the unpaginated format;
        determining the second byte offset information for the second visual element indicates an element width that is greater than a width threshold;
        reducing the element width of the second visual element to less than or equal to the width threshold; and
        generating a second DOM tree with updated second byte offset information in response to the reducing;
    computing, by the processor, a final layout for the electronic document in a paginated format based at least in part on:
        reviewing the preliminary layout to identify a plurality of horizontal areas to assign one or more page breaks without a visual element spanning multiple pages of the electronic document; and
        assigning a page break to one or more of the plurality of horizontal areas;
    rendering, by the processor, a current page in the viewport in accordance with the final layout, wherein the current page excludes the first visual element comprising at least a portion excluded by the page break from display within the viewport; and
    after changing from the current page to a new page, rendering, by the processor, the new page without re-computing the final layout of the electronic document, wherein the new page includes the first visual element.

2. The method of claim 1, further comprising:
    scanning the DOM tree to identify the second visual element having the element width that is greater than the width threshold.

3. The method of claim 1, further comprising:
    adding byte offsets for each of a plurality of tags to nodes of the DOM tree.

4. The method of claim 1, further comprising:
    generating a render tree from the second DOM tree, wherein the render tree is used to generate the preliminary layout.

5. The method of claim 1, further comprising:
    recording third byte offset information for a tag associated with a third visual element in the electronic document that is located at an upper left corner of the new page before closing the electronic document; and
    upon reopening the electronic document, using the third byte offset information to open the electronic document to the new page.

6. The method of claim 1, further comprising:
    receiving a command to change a property of the electronic document;
    recording third byte offset information for a tag associated with a third visual element in the electronic document that is located at an upper left corner of the new page; and
    rendering an updated page that includes the third visual element in an upper left corner of the updated page.

7. The method of claim 1, wherein the preliminary layout and the final layout are platform independent.

8. The method of claim 1, wherein the preliminary layout and final layout include placement of floating elements.

9. The method of claim 1, wherein the electronic document is a hypertext markup language (html) document.

10. A user device comprising:
    a memory to store instructions; and
    a processor of a user electronic device comprising a viewport for viewing the electronic document, the processor to execute the instructions to cause the processor to:
        receive an electronic document in an unpaginated format;
        generate a Document Object Model (DOM) tree comprising first byte offset information for a first visual element of the electronic document in the unpaginated format and second byte offset information for a second visual element of the electronic document in the unpaginated format;
        determine the second byte offset information for the second visual element indicates an element width that is greater than a width threshold;
        reduce the element width of the second visual element to less than or equal to the width threshold; and
        generate a second DOM tree with updated second byte offset information in response to the reducing;
        compute a preliminary layout for the electronic document in the unpaginated format using the DOM tree;
        identify a plurality of horizontal areas to assign one or more page breaks without a visual element spanning multiple pages of the preliminary layout of the electronic document;
        compute a final layout comprising a first page break assigned at a first horizontal area of the plurality of horizontal areas; and render a current page in the viewport in accordance with the final layout, wherein the current page excludes the first visual element comprising at least a portion excluded by the first page break from display within the viewport.

11. The user device of claim 10, the processor to:
scan the DOM tree to identify the second visual element having the element width that is greater than the width threshold.

12. The user device of claim 10, the processor to:
add byte offset information for each of a plurality of tags to nodes of the DOM tree.

13. The user device of claim 10, the processor to:
generate a render tree from the second DOM tree, wherein the render tree is used to generate the preliminary layout.

14. The user device of claim 10, the processor to:
record third byte offset information for a tag associated with a third visual element in the electronic document that is located at an upper left corner of a new page before closing the electronic document; and
upon reopening the electronic document, use the third byte offset information to open the electronic document to the new page.

15. The user device of claim 10, further comprising the instructions to cause the processor to:
receive a command to change a property of the electronic document;
record third byte offset information for a tag associated with a third visual element in the electronic document that is located at the upper left corner of a new page; and
render an updated page that includes the third visual element in an upper left corner of the updated page.

16. The user device of claim 10, wherein the preliminary layout and the final layout are platform independent.

17. A non-transitory computer readable storage medium including instructions that, when executed by a processor, cause the processor to perform a method of paginating an electronic document comprising:
receiving, by the processor of a user electronic device comprising a viewport for viewing the electronic document, the electronic document in an unpaginated format;
generating, by the processor, a preliminary layout for the electronic document in the unpaginated format, including assigning a layout width, determining sizes and positions of visual elements included in the electronic document, wherein generating the preliminary layout comprises:
generating a Document Object Model (DOM) tree comprising first byte offset information for a first visual element of the electronic document in the unpaginated format and second byte offset information for a second visual element of the electronic document in the unpaginated format;
determining the second byte offset information for the second visual element indicates an element width that is greater than a width threshold;
reducing the element width of the second visual element to less than or equal to the width threshold; and
generating a second DOM tree with updated second byte offset information in response to the reducing;
computing, by the processor, a final layout for the electronic document in a paginated format based at least in part on:
reviewing the preliminary layout to identify a plurality of horizontal areas to assign one or more page breaks without a visual element spanning multiple pages of the electronic document; and
assigning a page break to one or more of the plurality of horizontal areas;
rendering, by the processor, a current page in the viewport in accordance with the final layout, wherein the current page excludes the first visual element comprising at least a portion excluded by the page break from display within the viewport; and
after changing from the current page to a new page, rendering, by the processor, the new page without re-computing the final layout of the electronic document, wherein the new page includes the first visual element.

18. The non-transitory computer readable storage medium of claim 17, the method further comprising:
scanning the DOM tree to identify the second visual element having the element width that is greater than the width threshold.

19. The non-transitory computer readable storage medium of claim 17, the method further comprising:
adding byte offsets for each of a plurality of tags to nodes of the DOM tree.

20. The non-transitory computer readable storage medium of claim 17, the method further comprising:
recording third byte offset information for a tag associated with a third visual element in the electronic document that is located at an upper left corner of the new page before closing the electronic document; and
upon reopening the electronic document, using the third byte offset information to open the electronic document to the new page.

21. The non-transitory computer readable storage medium of claim 17, the method further comprising:
receiving a command to change a property of the electronic document;
recording third byte offset information for a tag associated with a third visual element in the electronic document that is located at an upper left corner of the new page; and
rendering an updated page that includes the third visual element in an upper left corner of the updated page.

22. The non-transitory computer readable storage medium of claim 19, wherein the layout is platform independent.

* * * * *